(12) United States Patent
Nakanishi

(10) Patent No.: US 11,480,888 B2
(45) Date of Patent: Oct. 25, 2022

(54) IMAGE FORMING APPARATUS

(71) Applicant: CANON KABUSHIKI KAISHA, Tokyo (JP)

(72) Inventor: Koichiro Nakanishi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/474,344

(22) Filed: Sep. 14, 2021

(65) Prior Publication Data

US 2022/0197176 A1 Jun. 23, 2022

(30) Foreign Application Priority Data

Dec. 18, 2020 (JP) .............................. JP2020-210269

(51) Int. Cl.
| | |
|---|---|
| *G03G 15/043* | (2006.01) |
| *G06K 15/12* | (2006.01) |
| *G03G 15/26* | (2006.01) |
| *G03G 15/04* | (2006.01) |

(52) U.S. Cl.
CPC ..... *G03G 15/043* (2013.01); *G03G 15/04036* (2013.01); *G03G 15/04063* (2013.01); *G03G 15/26* (2013.01); *G06K 15/1247* (2013.01); *G03G 2215/0407* (2013.01); *G03G 2215/0412* (2013.01)

(58) Field of Classification Search
CPC ........... G03G 15/043; G03G 15/04036; G03G 15/04063; G03G 15/26; G03G 2215/0407; G03G 2215/0412; G06K 15/1247

See application file for complete search history.

(56) References Cited

U.S. PATENT DOCUMENTS

| | | | |
|---|---|---|---|
| 9,513,106 B2 | 12/2016 | Nakanishi | |
| 2006/0028534 A1* | 2/2006 | Kobayashi | ............... B41J 2/435 347/238 |
| 2006/0146117 A1* | 7/2006 | Kobayashi | ....... G03G 15/04072 347/224 |
| 2015/0015657 A1* | 1/2015 | Shikina | ............ G03G 15/04054 347/118 |

(Continued)

FOREIGN PATENT DOCUMENTS

| | | | |
|---|---|---|---|
| JP | 2011161632 A | * | 8/2011 |
| JP | 2015-112856 A | | 6/2015 |

(Continued)

*Primary Examiner* — Ryan D Walsh
(74) *Attorney, Agent, or Firm* — Venable LLP

(57) ABSTRACT

An image forming apparatus includes: an exposure head including a first light emitting chip, a second light emitting chip, a first lens fixed to a housing at a position facing the first light emitting chip, and configured to form an image of light emitted from a plurality of light emitting portions included in the first light emitting chip on a photoreceptor, and a second lens provided separately from the first lens, fixed to the housing at a position facing the second light emitting chip, and configured to form an image of light emitted from a plurality of light emitting portions included in the second light emitting chip on the photoreceptor; and a controller capable of controlling application of a voltage to each of a plurality of electrodes of the first light emitting chip and a plurality of electrodes of the second light emitting chip so as to form one pixel.

3 Claims, 17 Drawing Sheets

(56) References Cited

U.S. PATENT DOCUMENTS

| | | | |
|---|---|---|---|
| 2017/0097573 A1* | 4/2017 | Rubin Ben Haim | ........................ G03G 15/04072 |
| 2019/0377279 A1* | 12/2019 | Yoshida | ............... G03G 15/043 |
| 2021/0055669 A1* | 2/2021 | Yoshida | ............ G03G 15/04081 |
| 2021/0088928 A1 | 3/2021 | Nakanishi | |
| 2022/0019153 A1* | 1/2022 | Sato | ..................... G03G 15/043 |
| 2022/0066351 A1* | 3/2022 | Yoshida | ............... G03G 15/043 |
| 2022/0146959 A1* | 5/2022 | Furuta | ............. G03G 15/04054 |
| 2022/0171307 A1* | 6/2022 | Kamata | ............ G03G 15/04036 |

FOREIGN PATENT DOCUMENTS

| | | | |
|---|---|---|---|
| JP | 2021030568 A | * | 3/2021 |
| JP | 2021030569 A | * | 3/2021 |

\* cited by examiner

IMAGE FORMING APPARATUS

BACKGROUND OF THE INVENTION

Field of the Invention

The present invention relates to an image forming apparatus such as an electrophotographic copying machine or an electrophotographic printer that forms an image on a sheet using an electrophotographic system.

Description of the Related Art

In the case where an image is formed by an image forming apparatus using an electrophotographic system, first, an electrostatic latent image is formed on a surface of a photoreceptor by irradiating the surface of the photoreceptor with light according to image data. Thereafter, toner is caused to adhere to the electrostatic latent image on the surface of the photoreceptor by a developing device to form a toner image, the toner image is transferred to a sheet, and the toner image transferred to the sheet is heated by a fixing device to be fixed to the sheet to form the image.

Japanese Patent Laid-Open No. 2015-112856 describes, as an apparatus that irradiates a photoreceptor with light to form an electrostatic latent image, an image forming apparatus including a light emitting portion using organic EL or the like and an exposure head having a lens that forms an image of light emitted from the light emitting portion on a surface of the photoreceptor. By using the exposure head in this manner, it is possible to reduce the number of components and reduce the size and manufacturing cost of the image forming apparatus as compared with a configuration of a laser scanning system in which laser light is deflected by a rotary polygon mirror for scanning to form an electrostatic latent image.

It cannot be said that a quantity of light emitted from a light emitting portion using an LED, an organic EL, or the like included in the exposure head is sufficiently high. Therefore, in exposure processing, it is desirable that deterioration of image quality can be suppressed by compensating for a light quantity for formation of a pixel.

SUMMARY OF THE INVENTION

It is desirable to provide an image forming apparatus that forms an electrostatic latent image by irradiating a surface of a photoreceptor with light by an exposure head, and is capable of compensating for a light quantity for formation of a pixel.

A representative configuration of the present invention is an image forming apparatus that irradiates a surface of a photoreceptor with light to form an electrostatic latent image and causes toner to adhere to the electrostatic latent image to form an image, the image forming apparatus comprising:
an exposure head configured to irradiate the surface of the photoreceptor with light to form the electrostatic latent image,
the exposure head including:
a housing;
a first circuit board fixed to the housing;
a first light emitting chip and a second light emitting chip that each include a second circuit board mounted on the first circuit board, and a plurality of light emitting portions configured to emit light, the plurality of light emitting portions including a first electrode layer including a plurality of electrodes arranged in a rotational axis direction of the photoreceptor and arranged separately on the second circuit board, a light emitting layer laminated on the first electrode layer and configured to emit light when a voltage is applied, and a second electrode layer configured to allow light to pass through and arranged on a side opposite to a side where the first electrode layer is arranged with respect to the light emitting layer, the first light emitting chip and the second light emitting chip being arranged at the same position in the rotational axis direction of the photoreceptor and at different positions in a rotational direction of the photoreceptor;
a first lens configured to form an image of light emitted from the plurality of light emitting portions included in the first light emitting chip on the photoreceptor, the first lens being fixed to the housing at a position facing the first light emitting chip; and
a second lens configured to form an image of light emitted from the plurality of light emitting portions included in the second light emitting chip on the photoreceptor, the second lens being provided separately from the first lens and being fixed to the housing at a position facing the second light emitting chip; and
a controller configured to control application of a voltage to each of the plurality of electrodes of the first light emitting chip and the plurality of electrodes of the second light emitting chip based on image data such that the light emitting layer of the first light emitting chip and the light emitting layer of the second light emitting chip emit light, the controller being capable of controlling application of the voltage to each of the plurality of electrodes of the first light emitting chip and the plurality of electrodes of the second light emitting chip such that one pixel is formed by applying the voltage to the plurality of electrodes of the first light emitting chip and the plurality of electrodes of the second light emitting chip.

Further features of the present invention will become apparent from the following description of exemplary embodiments with reference to the attached drawings.

DESCRIPTION OF THE EMBODIMENTS

<Image Forming Apparatus>

Hereinafter, an overall configuration of an image forming apparatus A according to the present invention will be described with reference to the drawings together with an operation at the time of image formation. The dimensions, materials, shapes, relative arrangements, and the like of components described below are not intended to limit the scope of the present invention only to them unless otherwise specified.

The image forming apparatus A is a full-color image forming apparatus that transfers toners of four colors of yellow Y, magenta M, cyan C, and black K to a sheet to form an image. In the following description, Y, M, C, and K are added as suffixes to members using the toners of the respective colors, but the configurations and operations of the members are substantially the same except that the colors of the toners to be used are different, and thus the suffixes are appropriately omitted unless distinction is required.

Figure 1:
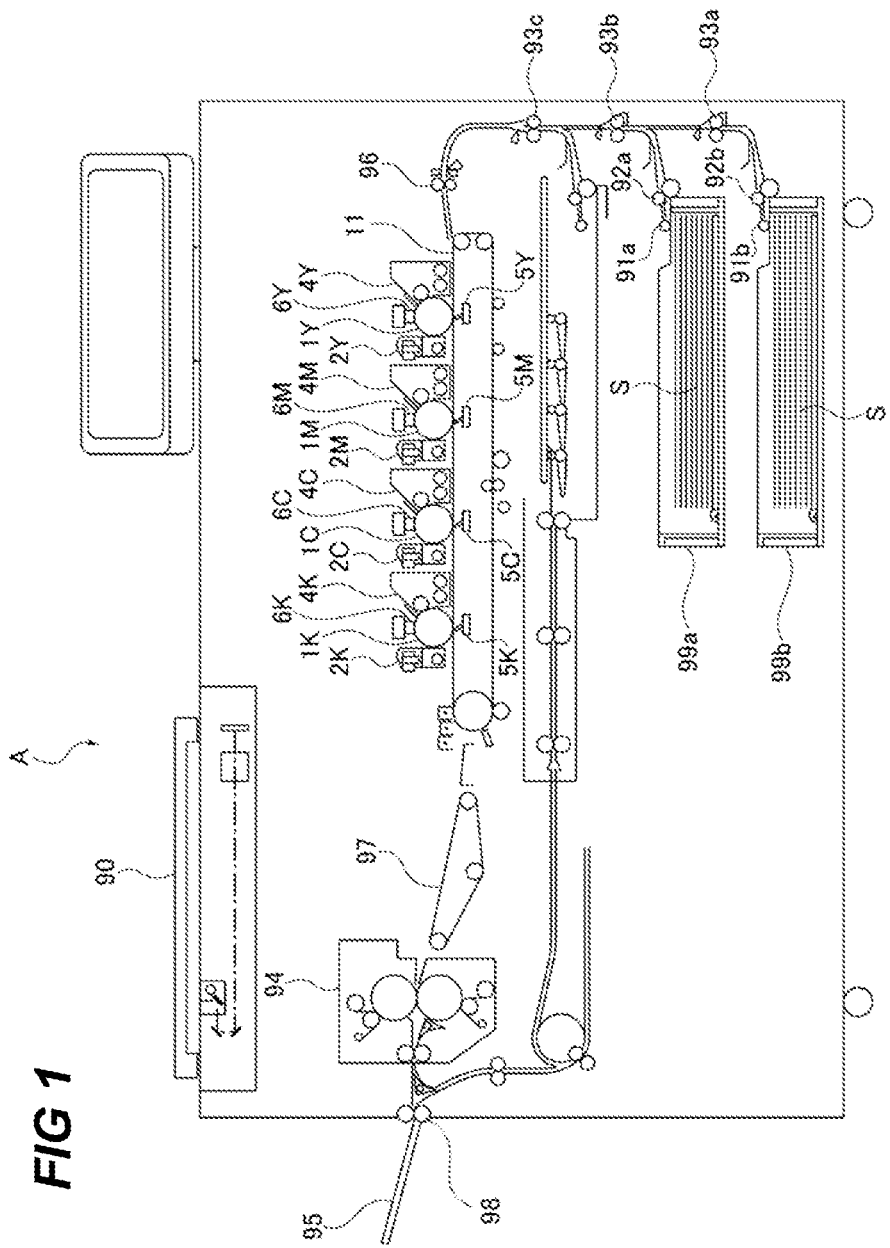
FIG. 1 is a schematic cross-sectional view of an image forming apparatus.

FIG. 1 is a schematic cross-sectional view of the image forming apparatus A. As illustrated in FIG. 1, the image forming apparatus A includes an image forming portion that forms an image. The image forming portion includes a photosensitive drum 1 (1Y, 1M, 1C, 1K) as a photosensitive member, a charging device 2 (2Y, 2M, 2C, 2K), an exposure head 6 (6Y, 6M, 6C, 6K), a developing device 4 (4Y, 4M, 4C, 4K), and a transfer device 5 (5Y, 5M, 5C, 5K).

Next, an image forming operation by the image forming apparatus A will be described. In the case of forming an image, first, a sheet S stored in a sheet cassette 99a or a sheet cassette 99b is conveyed to a registration roller 96 by pickup rollers 91a and 91b, feeding rollers 92a and 92b, and conveying rollers 93a to 93c. Thereafter, the sheet S is fed to a conveying belt 11 by the registration roller 96 at predetermined time.

On the other hand, in the image forming portion, first, the surface of the photosensitive drum 1Y is charged by the charging device 2Y. Next, the exposure head 6Y irradiates the surface of the photosensitive drum 1Y with light according to image data read by an image reading portion 90 or image data transmitted from an external device (not illustrated), and forms an electrostatic latent image on the surface of the photosensitive drum 1Y. Thereafter, a yellow toner is caused to adhere to the electrostatic latent image formed on the surface of the photosensitive drum 1Y by the developing device 4Y to form a yellow toner image on the surface of the photosensitive drum 1Y. When a transfer bias is applied to the transfer device 5Y, the toner image formed on the surface of the photosensitive drum 1Y is transferred to the sheet S being conveyed by the conveying belt 11.

By a similar process, the photosensitive drums 1M, 1C, and 1K are also irradiated with light from the exposure heads 6M, 6C, and 6K to form electrostatic latent images, and toner images of magenta, cyan, and black are formed by the developing devices 4M, 4C, and 4K. Then, when a transfer bias is applied to the transfer devices 5M, 5C, and 5K, these toner images are transferred and superimposed onto the yellow toner image on the sheet S. As a result, a full-color toner image corresponding to the image data is formed on the surface of the sheet S.

Thereafter, the sheet S carrying the toner image is conveyed to a fixing device 94 by a conveying belt 97, and subjected to heating and pressurization processing in the fixing device 94. As a result, the toner image on the sheet S is fixed to the sheet S. Thereafter, the sheet S on which the toner image is fixed is discharged to a discharge tray 95 by a discharge roller 98.

<Exposure Head>

Next, a configuration of the exposure head 6 will be described.

Figure 2A:
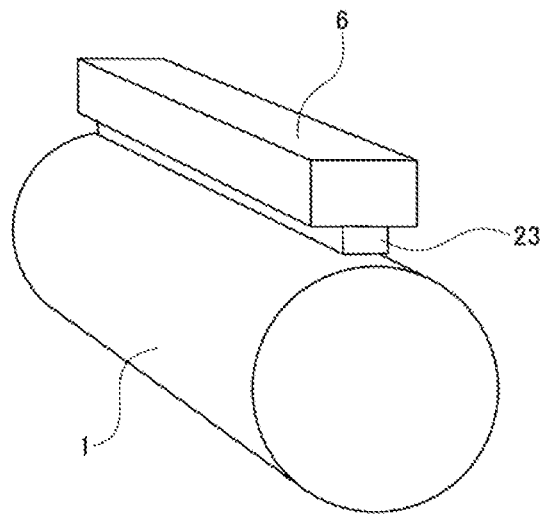
FIGS. 2A and 2B are a perspective view and a cross-sectional view of a photosensitive drum and an exposure head.
Figure 2B:
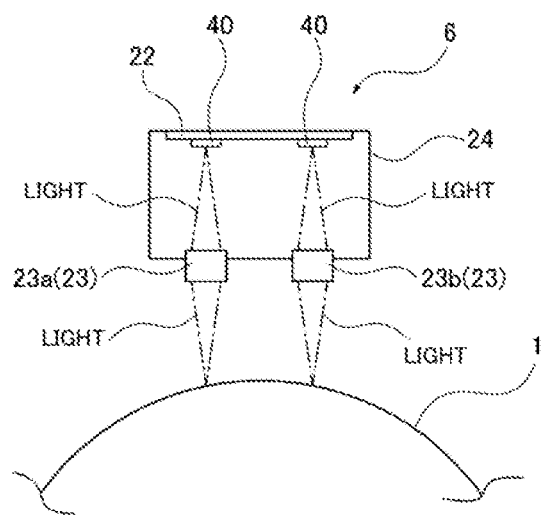
Figure 3A:
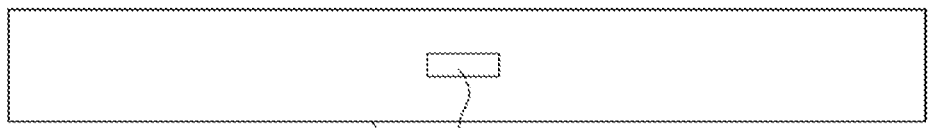
FIGS. 3A, 3B, and 3C are diagrams illustrating mounting surfaces of a printed board included in the exposure head.
Figure 3B:
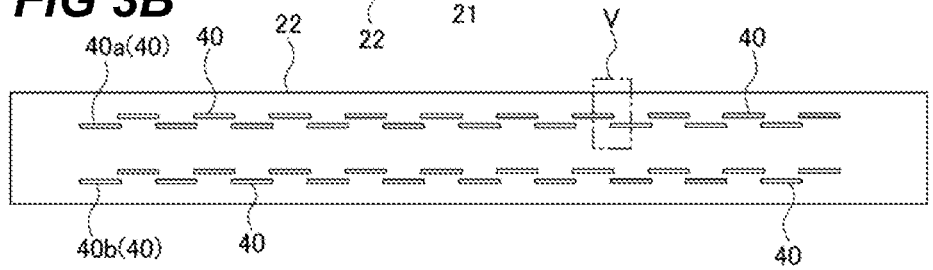
Figure 3C:
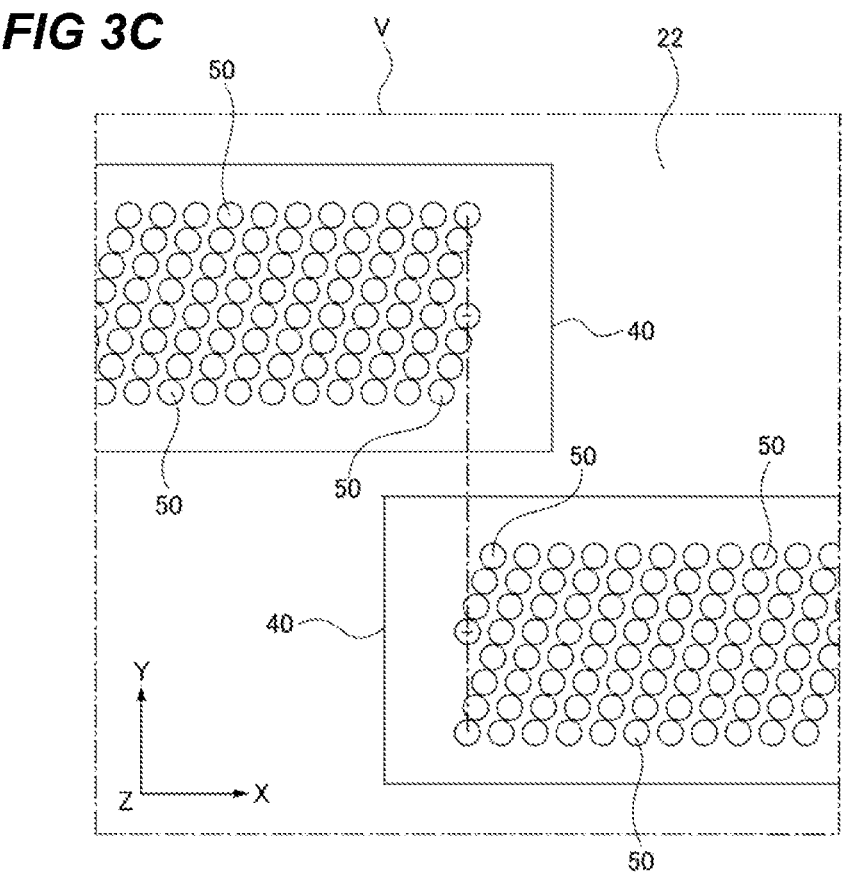

FIG. 2A is a perspective view of the photosensitive drum 1 and the exposure head 6. FIG. 2B is a cross-sectional view of the photosensitive drum 1 and the exposure head 6. FIGS. 3A and 3B are views illustrating mounting surfaces on one side and the other side of a printed board 22 included in the exposure head 6. FIG. 3C is an enlarged view of a region V illustrated in FIG. 3B.

As illustrated in FIGS. 2A and 2B, the exposure head 6 is fixed at a position facing the surface of the photosensitive drum 1 by a fixing member (not illustrated). The exposure head 6 includes light emitting element array chips 40 that emit light and the printed board 22 (first circuit board) on which the light emitting element array chips 40 are mounted. Further, the exposure head 6 includes a rod lens array 23 that forms (condenses) an image of the light emitted from the light emitting element array chips 40 on the photosensitive drum 1, and a housing 24 to which the rod lens array 23 and the printed board 22 are fixed.

A connector 21 is mounted on a surface of the printed board 22 opposite to a surface of the printed board 22 on which the light emitting element array chips 40 are mounted. The connector 21 is provided to transmit a control signal transmitted from the image controller 70 (FIG. 8) to control the light emitting element array chips 40, and to connect a power supply line. The light emitting element array chips 40 are driven via the connector 21.

As illustrated in FIGS. 3A to 3C, on the printed board 22, the plurality of light emitting element array chips 40 is mounted in four rows in a staggered manner. The light emitting element array chip 40a (first light emitting chip) and the light emitting element array chip 40b (second light emitting chip) are arranged at the same position in the arrow X direction which is the rotational axis direction of the photosensitive drum 1 and at different positions in the rotational direction (arrow Y direction) of the photosensitive drum 1. The light emitting element array chips 40a and 40b have been described as an example, but other light emitting element array chips 40 are arranged in a similar manner. Note that the positions of the light emitting element array chips 40a and 40b in the arrow X direction and the arrow Y direction may be shifted within a tolerance range.

In each light emitting element array chip 40, a plurality of light emitting portions 50 is arranged at a resolution pitch of 1200 dpi (about 21.16 μm) in the longitudinal direction (arrow X direction). In addition, in each light emitting element array chip 40, the plurality of light emitting portions 50 is arranged at a predetermined pitch in the lateral direction (arrow Y direction). That is, in each light emitting element array chip 40, the light emitting portions 50 are two-dimensionally arranged in the arrow X direction and the arrow Y direction.

In the present embodiment, the arrow X direction, which is the longitudinal direction of each light emitting element array chip 40, is the rotational axis direction of the photosensitive drum 1 and is also the main scanning direction. The arrow Y direction, which is the lateral direction of each light emitting element array chip 40, is the rotational direction of the photosensitive drum 1 and is also the sub-scanning direction. In addition, the arrow Z direction is a laminating direction in which layers of each light emitting portion 50 having a layer structure described later are laminated. Note that the longitudinal direction of each light emitting element array chip 40 may be inclined by about ±1° with respect to the rotational axis direction of the photosensitive drum 1. In addition, the lateral direction of each light emitting element array chip 40 may also be inclined by about ±1° with respect to the rotational direction of the photosensitive drum 1.

<Light Emitting Element Array Chip>

Next, a configuration of each light emitting element array chip 40 will be described.

Figure 4:
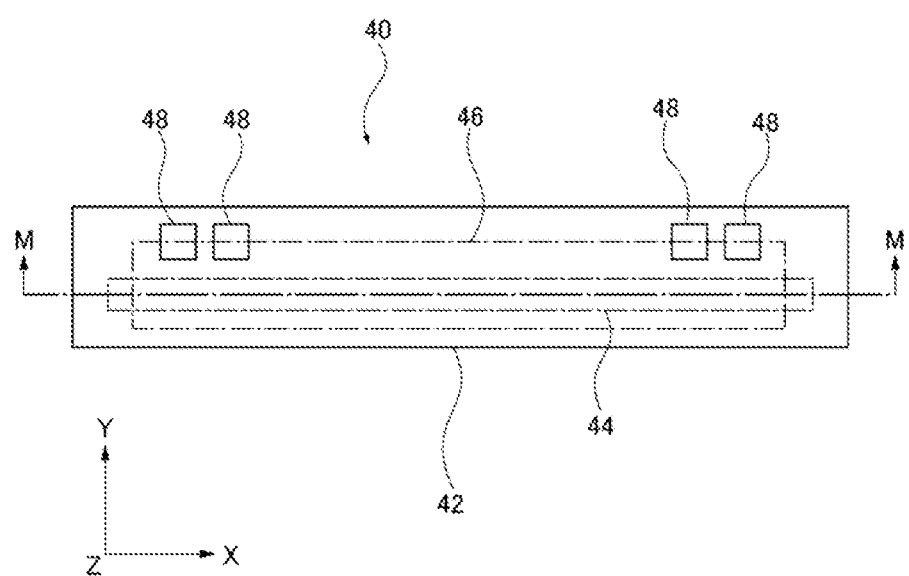
FIG. 4 is a schematic view of a light emitting element array chip.
Figure 5:
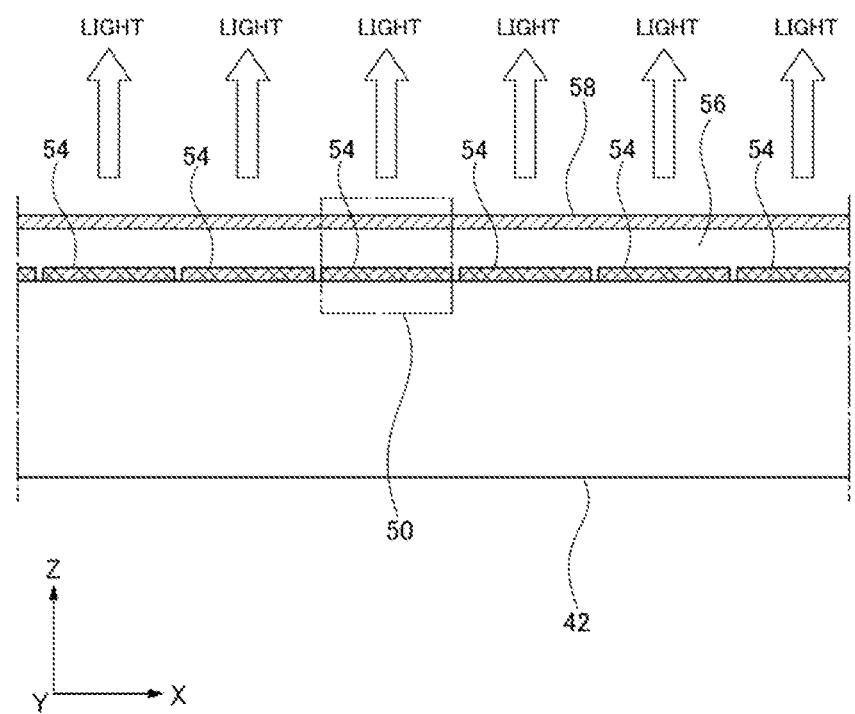
FIG. 5 is a cross-sectional view of the light emitting element array chip.

FIG. 4 is a schematic diagram of the light emitting element array chip 40. FIG. 5 is a cross-sectional view of the light emitting element array chip 40 taken along line M-M illustrated in FIG. 4.

As illustrated in FIG. 4, the light emitting element array chip 40 includes a light emitting substrate 42 (second circuit board) incorporating a circuit portion 46 for controlling the light emitting portions 50, a light emitting region 44 in which the plurality of light emitting portions 50 is regularly arranged on the light emitting substrate 42, and a wire bonding pad 48. The light emitting substrate 42 is mounted on the printed board 22. Input and output of signals between the outside of the light emitting element array chip 40 and the circuit portion 46 and power supply to the circuit portion 46 are performed via the wire bonding pad 48. Note that the circuit portion 46 can use a circuit including an analog drive circuit, a digital control circuit, or both of them.

As illustrated in FIG. 5, the light emitting portions 50 include the light emitting substrate 42, a plurality of lower electrodes 54 two-dimensionally arranged at regular intervals in the arrow X direction and the arrow Y direction on the light emitting substrate 42, a light emitting layer 56, and an upper electrode 58.

The lower electrodes 54 (first electrode layer having a plurality of electrodes) are a plurality of electrodes formed in a layered and separated manner on the light emitting substrate 42, and each of the electrodes is provided corresponding to each pixel. The upper electrode 58 (second electrode layer) is laminated on the light emitting layer 56 at a position opposite to a side where the lower electrodes 54 are arranged with respect to the light emitting layer 56. The upper electrode 58 is capable of transmitting light having an emission wavelength of the light emitting layer 56.

The circuit portion 46 controls the potential of a selected lower electrode 54 among the lower electrodes 54 based on a control signal generated according to the image data, and generates a potential difference between the selected lower electrode 54 and the upper electrode 58. When the potential difference is generated between the upper electrode 58 as an anode and the lower electrode 54 as a cathode, electrons flow into the light emitting layer 56 from the cathode, and holes flow into the light emitting layer 56 from the anode.

The light emitting layer 56 emits light by recombination of the electrons and the holes in the light emitting layer 56.

Light directed to the upper electrode 58 by light emission of the light emitting layer 56 is transmitted through the upper electrode 58 and emitted. In addition, light directed from the light emitting layer 56 toward the lower electrodes 54 is reflected by the lower electrodes 54 toward the upper electrode 58, and the reflected light is also transmitted through the upper electrode 58 and emitted. In this manner, the light emitting portions 50 emit light. Although there is a time difference between the time when the light directly directed from the light emitting layer 56 toward the upper electrode 58 is emitted from the upper electrode 58 and the time when the light reflected by the lower electrodes 54 is emitted from the upper electrode 58, the thickness of the layer of each light emitting portion 50 is extremely small, and thus the emission times can be regarded as almost the same.

In the present embodiment, the light emitting substrate 42 is a silicon substrate. The upper electrode 58 can be transparent to the light having the emission wavelength of the light emitting layer 56. For example, when a transparent electrode such as an indium tin oxide (ITO) is used, the aperture ratio is substantially 100%, and the light emitted from the light emitting layer 56 passes through the upper electrode 58 and is emitted as it is. In the present embodiment, the upper electrode 58 is an anode provided in common for each of the lower electrodes 54, but may be provided individually for each of the lower electrodes 54, or one upper electrode 58 may be provided for each of the plurality of lower electrodes 54. When a transparent electrode is used as the upper electrode 58, the whole electrode is not necessarily a transparent electrode, and only an opening through which light is emitted may be a transparent electrode, and an electrode other than the transparent electrode, such as a metal wire, may be used for wiring except for the opening.

As the light emitting layer 56, an organic EL film, an inorganic EL layer, or the like is used. When an organic EL film (organic light emitting layer) is used as the light emitting layer 56, the light emitting layer 56 may be a laminated structure including functional layers such as an electron transport layer, a hole transport layer, an electron injection layer, a hole injection layer, an electron blocking layer, and a hole blocking layer as necessary. Further, the light emitting layer 56 may be formed to be continuous in the arrow X direction, or may be divided into portions of the same size as the lower electrode 54. In addition, the lower electrodes 54 may be classified into a plurality of groups, and for each of the classified groups, one light emitting layer 56 may be laminated on an upper portion of the lower electrodes 54 belonging to the group.

When a light emitting material weak against moisture, such as an organic EL layer or an inorganic EL layer, is used as the light emitting layer 56, it is desirable to perform sealing in order to prevent moisture from entering the light emitting region 44. As a sealing method, for example, a thin film of a silicon oxide, a silicon nitride, an aluminum oxide, or the like or a laminated film thereof is formed. As a method for forming the sealing film, a method excellent in performance to cover a structure such as a step can be used, for example, an atomic layer deposition method (ALD method) or the like can be used. Note that the material, configuration, forming method, and the like of the sealing film are merely examples, and are not limited to the examples described above, and a suitable material, configuration, forming method, and the like may be appropriately selected.

The lower electrodes 54 can be made of a metal having a high reflectance for the emission wavelength of the light emitting layer 56. For example, Ag, Al, or an alloy of Ag and Al is used. The lower electrodes 54 are formed by using a Si integrated circuit processing technique together with the formation of the circuit portion 46, and are directly connected to a drive portion of the circuit portion 46. As described above, since the lower electrodes 54 are formed using the Si integrated circuit processing technique, the process rule is about 0.2 μm and high accuracy is obtained, so that the lower electrodes 54 can be accurately and densely arranged. Furthermore, since the lower electrodes 54 can be densely arranged, most of the light emitting region 44 can be caused to emit light, and the utilization efficiency of the light emitting region 44 can be improved. An organic material of the light emitting layer 56 is filled between the respective lower electrodes 54, and the respective lower electrodes 54 are partitioned by the organic material.

In addition, in each light emitting portion 50, when a voltage applied to both ends becomes a predetermined value or more, a current starts to flow, and thereafter, the value of the current increases substantially in proportion to the value of the voltage. The voltage at which the current starts to flow in each light emitting portion 50 varies. Therefore, before product shipment from a factory, the light emitting portions 50 of the light emitting element array chips 40 are caused to individually and sequentially emit light, and the current flowing in each light emitting portion 50 is adjusted so that light condensed through the rod lens array 23 has a predetermined light quantity. Note that the exposure head 6 performs not only the above-described light quantity adjustment but also focus adjustment for adjusting the interval between the light emitting element array chips 40 and the rod lens array 23 before product shipment from the factory.

Figure 6A:
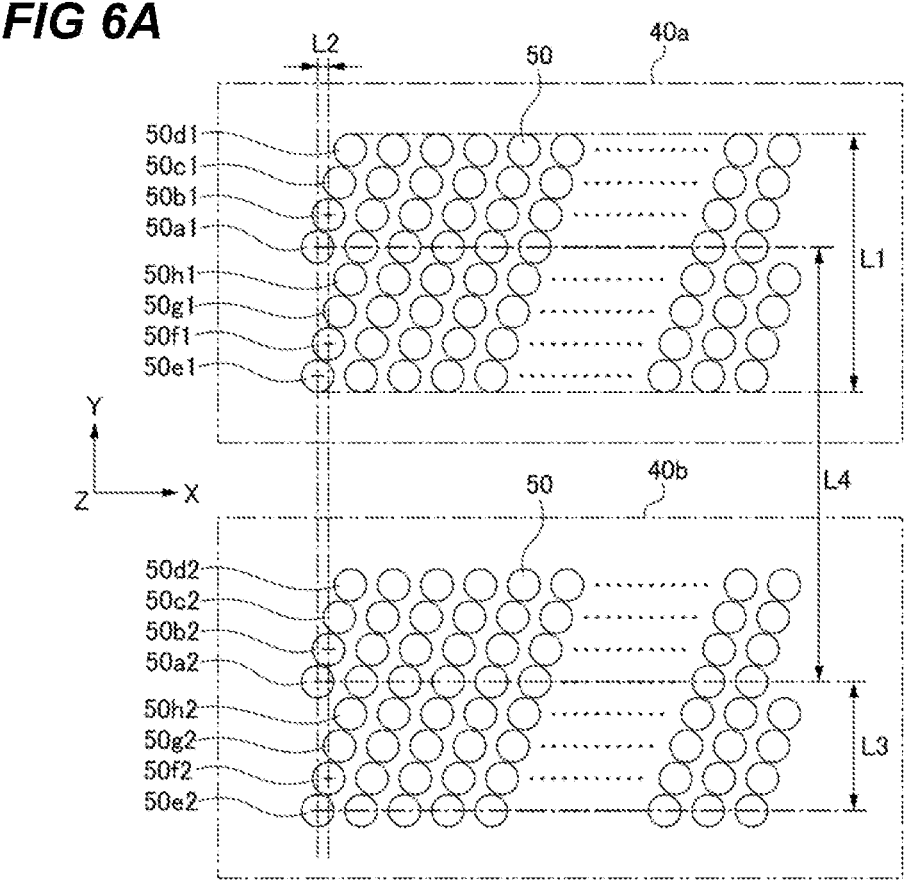
FIGS. 6A and 6B are schematic diagrams describing arrangement of light emitting portions.

FIG. 6A is a schematic diagram describing the arrangement of the light emitting portions 50 of each of the light emitting element array chips 40a and 40b illustrated in FIG. 3B. Note that, although the light emitting element array chips 40a and 40b will be described below as an example, each light emitting portions 50 of the light emitting element array chips 40 arranged at the same position in the arrow X direction and at different positions in the arrow Y direction have similar configurations.

As illustrated in FIG. 6A, each light emitting portion 50 of the light emitting element array chip 40a has a circular shape with a diameter of 60 μm, and eight light emitting portions 50 are arranged side by side within a range of a length L1 (480 μm in the present embodiment) in the arrow Y direction. In addition, the light emitting portion 50a1 and the light emitting portion 50e1 are arranged at the same position in the arrow X direction and at different positions in the arrow Y direction. The same applies to the light emitting portions 50b1 and 50f1, the light emitting portions 50c1 and 50g1, and the light emitting portions 50d1 and 50h1. That is, the light emitting element array chip 40a is provided with a plurality of sets of light emitting portions 50 arranged at the same position in the arrow X direction and at different positions in the arrow Y direction. Two light emitting portions 50 adjacent to each other in the arrow Y direction are arranged such that the position of one of the light emitting portions 50 is shifted by a distance L2 from the position of the other light emitting portion 50 in the arrow X direction. In the present embodiment, the distance L2 is set to 21.16 μm (1200 dpi).

Since the light emitting element array chip 40b uses the same components as the light emitting element array chip 40a, the configurations of the light emitting portions 50 (shapes, arrangements) of the light emitting element array chip 40b are the same as or similar to the configurations of the light emitting portions 50 of the light emitting element array chip 40a. In addition, as described above, the light emitting element array chip 40a and the light emitting element array chip 40b are arranged at the same position in the arrow X direction and at different positions in the arrow Y direction. Therefore, in the arrow X direction, the two light emitting portions 50 of the light emitting element array chip 40a and the two light emitting portions 50 of the light emitting element array chip 40b are arranged at the same position.

For example, the light emitting portions 50a1 and 50e1 of the light emitting element array chip 40a and the light emitting portions 50a2 and 50e2 of the light emitting element array chip 40b are arranged at the same position in the arrow X direction and at different positions in the arrow Y direction. The same applies to the light emitting portions 50b1, 50b2, 50f1, and 50f2, the light emitting portions 50c1, 50c2, 50g1, and 50g2, and the light emitting portions 50d1, 50d2, 50h1, and 50h2.

A case where the light emitting portion 50a1, the light emitting portion 50e1, the light emitting portion 50a2, and the light emitting portion 50e2 are arranged in this order from the upstream side to the downstream side in the rotational direction of the photosensitive drum 1 is considered. In this case, when the light emitting portion 50e1 emits light after a predetermined time elapses after the light emitting portion 50a1 emits light in the exposure processing, the same position on the photosensitive drum 1 is exposed by light emitted from the light emitting portions 50a1 and 50e1. In other words, one pixel is formed on the photosensitive drum 1 by the light emitted from the light emitting portions 50a1 and 50e1. Hereinafter, irradiating the same position on the photosensitive drum 1 with light from a plurality of light emitting portions 50 is referred to as multiple exposure. Similarly, the light emitting portion 50a2 emits light after a predetermined time elapses after the light emitting portion 50e1 emits light, and the light emitting portion 50e2 emits light after the predetermined time elapses after the light emission by the light emitting portion 50a2, so that multiple exposure can be performed.

A delay time by which the light emission of the light emitting portion 50 is delayed in multiple exposure is Δt, the rotation speed of the photosensitive drum 1 is v, and the distance in the arrow Y direction between the light emitting portions 50 that perform the multiple exposure is L3 (FIG. 6A). In this case, the delay time Δt is calculated from Δt=L3/v. In the present embodiment, the distance L3 is 240 μm, and the rotation speed v of the photosensitive drum 1 is 600 mm/s. Therefore, the delay time Δt between the time when the light emitting portion 50a2 emits the light and the time when the light emitting portion 50e2 emits the light is 0.4 ms.

In this manner, the image controller 70 (FIG. 8) controls light emission times of the light emitting portions 50 to perform the above-described multiple exposure. As a result, one pixel can be formed by the plurality of light emitting portions 50 that perform multiple exposure, and thus, even in a case where a quantity of light emitted from one light emitting portion 50 is small, a light quantity at the time of forming one pixel can be compensated. Therefore, it is possible to suppress shortage of a quantity of light for forming an electrostatic latent image in the exposure processing, and to suppress deterioration of image quality.

When the distance in the arrow Y direction between the light emitting portions 50 located at the same position in the arrow X direction is too long, the following problem may occur. That is, although the longitudinal direction of the printed board 22 and the rotational axis direction of the photosensitive drum 1 are parallel in design, a shift occurs due to the influence of tolerance and an assembly error. Due to the influence of this shift, a shift occurs in the relative positions of the light emitting portions 50a1, 50e1, 50a2, and 50e2 located at the same position in the arrow X direction in design. This shift increases as the distance in the arrow Y direction between the light emitting portions 50 arranged at the same position in design in the arrow X direction increases. A shift in the arrow X direction between the light emitting portions 50a1 and 50e2 separated from each other by the largest distance in the arrow Y direction will be considered below.

Figure 6B:
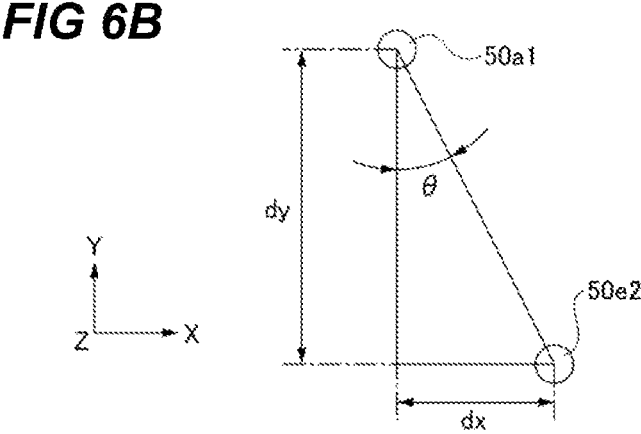

FIG. 6B is a schematic diagram illustrating a positional relationship between the light emitting portion 50a1 and the light emitting portion 50e2 in a case where the above-described shift occurs. As illustrated in FIG. 6B, in a case where the distance in the arrow X direction between the light emitting portion 50a1 and the light emitting portion 50e2 is dx and the distance in the arrow Y direction between the light emitting portion 50a1 and the light emitting portion 50e2 is dy, dy=dx/tan θ is satisfied. In a case where an assembly error between the printed board 22 and the photosensitive drum 1 is ±0.1 mm, and the length of the printed board 22 in the arrow X direction is 340 mm, tan θ is calculated by tan θ=(0.1×2)/340.

When a shift of a light imaging position on the photosensitive drum 1 exceeds 5 μm, the shift is easily visually recognized on an image output to the sheet S. Therefore, when dx=5 μm and tan θ=(0.1×2)/340 are substituted into the inequality of dy≤dx/tan θ in order to set the distance dx to 5 μm or less, dy≤8.5 mm is obtained. Therefore, by setting the distance dy to 8.5 mm or less, the shift of the light imaging position on the photosensitive drum 1 can be suppressed to 5 μm or less, and the shift is hardly visually recognized even in the image on the sheet S.

In addition, a distance L4 in the arrow Y direction between the light emitting portion 50a1 and the light emitting portion 50a2, that is, a pitch in the arrow Y direction between the light emitting element array chip 40a and the light emitting element array chip 40b is calculated by dy−L3. As described above, the distance L3 is 240 μm. Therefore, in order to make it difficult to visually recognize the shift on the image output to the sheet S, the distance L4 is preferably set to 8.26 mm or less from the calculation result obtained by substituting L3=240 μm and dy=8.5 mm into the inequality of L4≤dy−L3.

Figure 7:
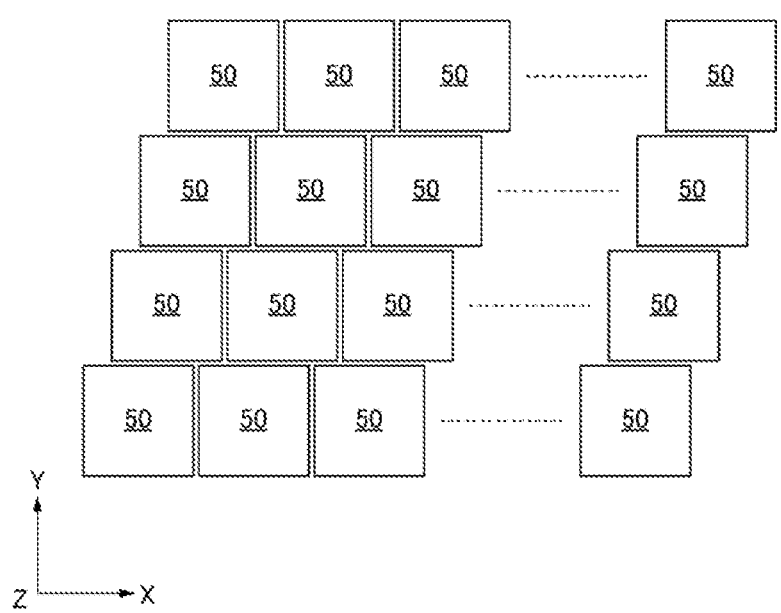
FIG. 7 is a schematic diagram describing the arrangement of the light emitting portions.

Note that, in the present invention, the shape of each light emitting portion 50 is not limited to a circular shape, and may be a polygonal shape with more corners than a quadrangle, an elliptical shape, or the like as long as light of an exposure region size corresponding to the output resolution of the image forming apparatus A is emitted and the quality of the output image satisfies the design specification of the image forming apparatus A. Note that, since a quantity of light emitted from the organic light emitting material is smaller than a quantity of light emitted from an LED, as illustrated in FIG. 7, by forming each light emitting portion 50 in a square and reducing distances between the adjacent light emitting portions 50, it is possible to secure a light emitting area for obtaining a quantity of light that changes the potential of the photosensitive drum 1.

Further, in the present embodiment, the configuration in which the light emitting portions 50 are two-dimensionally arranged in the arrow X direction and the arrow Y direction in each light emitting element array chip 40 has been described, but the plurality of light emitting portions 50 may be arranged at least in the arrow X direction. Even in this case, if the multiple exposure is performed by the light emitting portions 50 included in each light emitting element array chip 40 and located at the same position in the arrow X direction, a quantity of light to be used in the exposure processing can be increased as compared with a configuration in which the exposure processing is performed by one light emitting portion 50.

<System Configuration of Exposure Head>

Next, a configuration of the exposure head 6 and the image controller 70 (controller) that controls the exposure head 6 will be described. The image controller 70 is provided on the main body side of the image forming apparatus A. Although control that is performed to process one piece of image data (single color) will be described below, similar processing is performed in parallel on four pieces of image data corresponding to yellow, magenta, cyan, and black when the image forming operation is performed.

Figure 8:
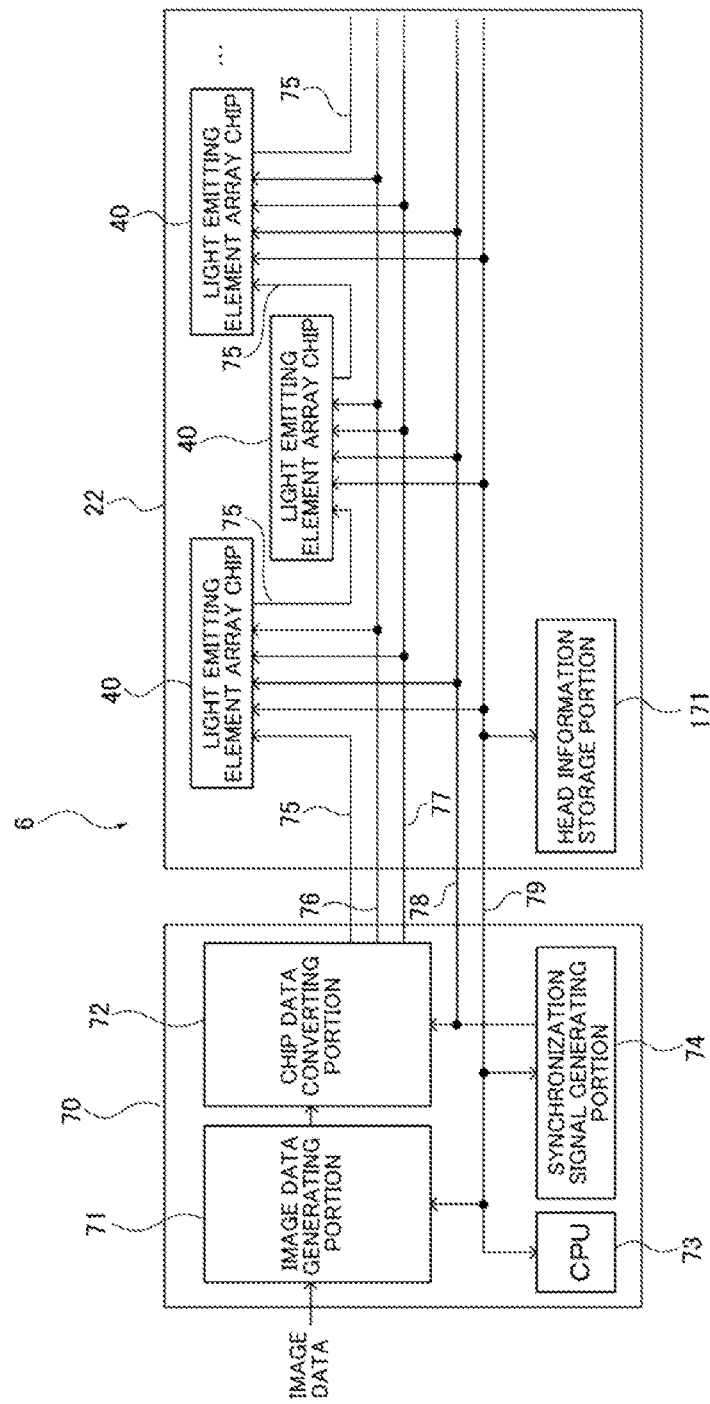
FIG. 8 is a block diagram illustrating a system configuration of an image controller and the exposure head.

FIG. 8 is a block diagram illustrating a system configuration of the image controller 70 and the exposure head 6. As illustrated in FIG. 8, the image controller 70 includes an image data generating portion 71, a chip data converting portion 72, a CPU 73, and a synchronization signal generating portion 74. The image controller 70 performs processing of image data, processing of image formation timing, transmission of a control signal for controlling the exposure head 6, and the like by using these portions.

Image data of an original read by the image reading portion 90 and image data transferred from an external device via a network are input to the image data generating portion 71. The image data generating portion 71 performs dithering processing on the input image data with a resolution instructed by the CPU 73, and generates image data for outputting an image.

The synchronization signal generating portion 74 generates a line synchronization signal representing a delimiter for each line of the image data. The CPU 73 sets, as one line cycle, a cycle in which the surface of the photosensitive drum 1 moves by a pixel size of 1200 dpi in the rotational direction with respect to a preset rotation speed of the photosensitive drum 1, and instructs the synchronization signal generating portion 74 to set a time interval of the signal cycle. For example, when the photosensitive drum 1 rotates at 200 mm/s, one line cycle is set to 105.8 μs, and the time interval is instructed.

The chip data converting portion 72 divides image data for one line into data pieces for the light emitting element array chips 40 in synchronization with the line synchronization signal generated by the synchronization signal generating portion 74 and input via the line synchronization signal line 78. Then, the chip data converting portion 72 transmits the image data for one line, together with a clock signal and a chip select signal indicating the effective range of the image data, to each light emitting element array chip 40 via a chip select signal line 75, a clock signal line 76, and an image data signal line 77.

A head information storage portion 171 included in the exposure head 6 is connected to the CPU 73 via a communication signal line 79. The head information storage portion 171 stores, as head information, a light emission quantity and mounting position information of each light emitting element array chip 40. In addition, each light emitting element array chip 40 causes the light emitting portions 50 to emit light based on a set value of each signal input from the image controller 70. In addition, each light emitting element array chip 40 generates a chip select signal to be used in the other light emitting element array chip 40 connected via the chip select signal line 75.

<System Configuration of Light Emitting Element Array Chip>

Next, a system configuration of each light emitting element array chip 40 will be described.

Figure 9:
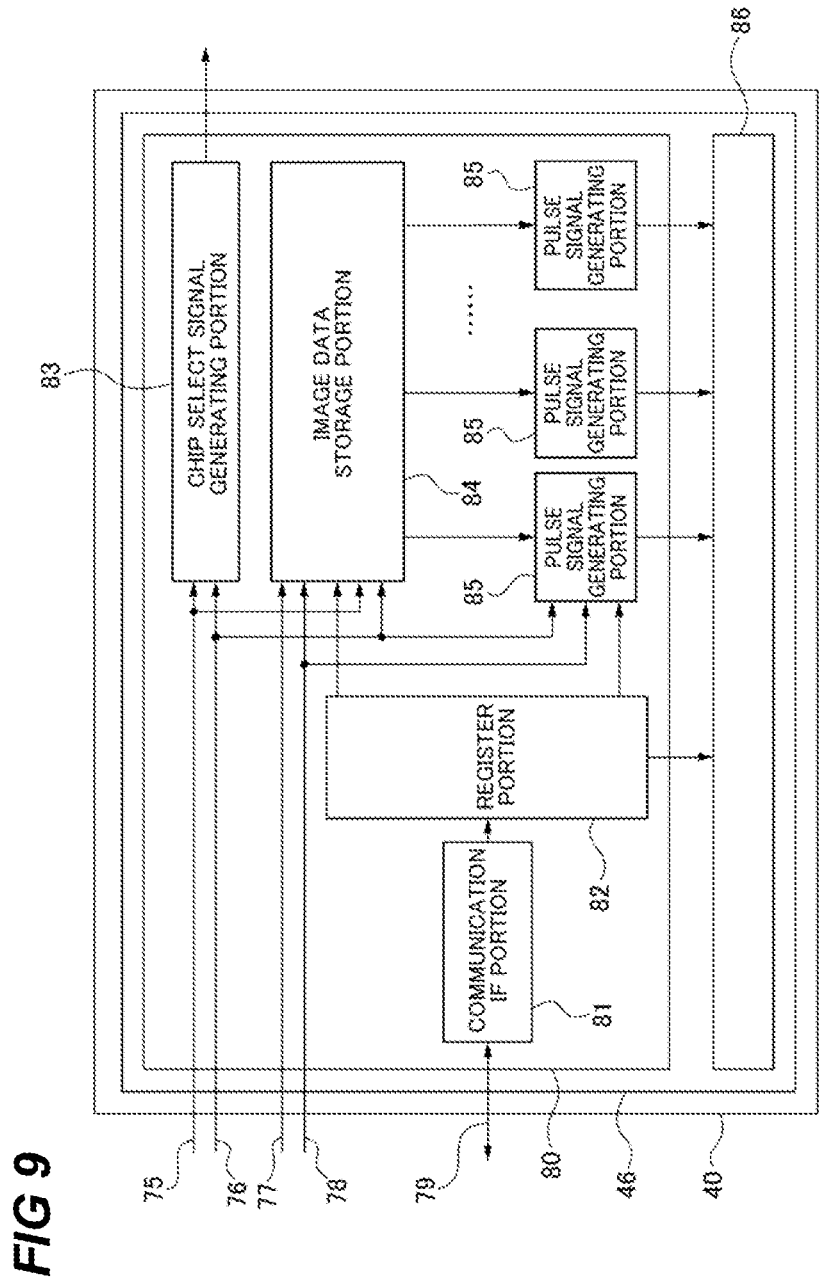
FIG. 9 is a block diagram illustrating a system configuration of the light emitting element array chip.

FIG. 9 is a block diagram illustrating a system configuration of the light emitting element array chip 40. As illustrated in FIG. 9, the circuit portion 46 of the light emitting element array chip 40 includes a digital portion 80 and an analog portion 86. As described later, the analog portion 86 generates a signal for driving the light emitting portions 50 based on a pulse signal generated by the digital portion 80.

The digital portion 80 includes a communication IF portion 81, a register portion 82, a chip select signal generating portion 83, an image data storage portion 84, and a pulse signal generating portion 85. The digital portion 80 uses these portions to generate a pulse signal for causing the light emitting portions 50 to emit light based on a value set in advance by a communication signal in synchronization with a clock signal, a chip select signal, an image data signal, and a line synchronization signal, and transmits the pulse signal to the analog portion 86.

The chip select signal generating portion 83 delays the input chip select signal and generates a chip select signal to be used in the other light emitting element array chip 40 connected via the chip select signal line 75.

The register portion 82 stores exposure timing information to be used in the image data storage portion 84, width information and phase information (delay information) of the pulse signal to be generated by the pulse signal generating portion 85, setting information of a drive current to be set by the analog portion 86, and the like. The communication IF portion 81 controls writing and reading of a set value to and from the register portion 82 based on a communication signal input from the CPU 73.

The image data storage portion 84 holds image data while the input chip select signal is valid, and outputs the image data to the pulse signal generating portion 85 in synchronization with the line synchronization signal. The pulse signal generating portion 85 generates the pulse signal for controlling the timing of turning on the light emitting portions 50 based on the width information and the phase information of the pulse signal that have been set in the register portion 82 according to the image data input from the image data storage portion 84, and outputs the pulse signal to the analog portion 86.

<Image Data Storage Portion>

Next, the operation of the image data storage portion 84 will be described. In the following description, although the chip select signal cs and the line synchronization signal lsync are negative logic signals, they may be positive logic signals.

Figure 10:
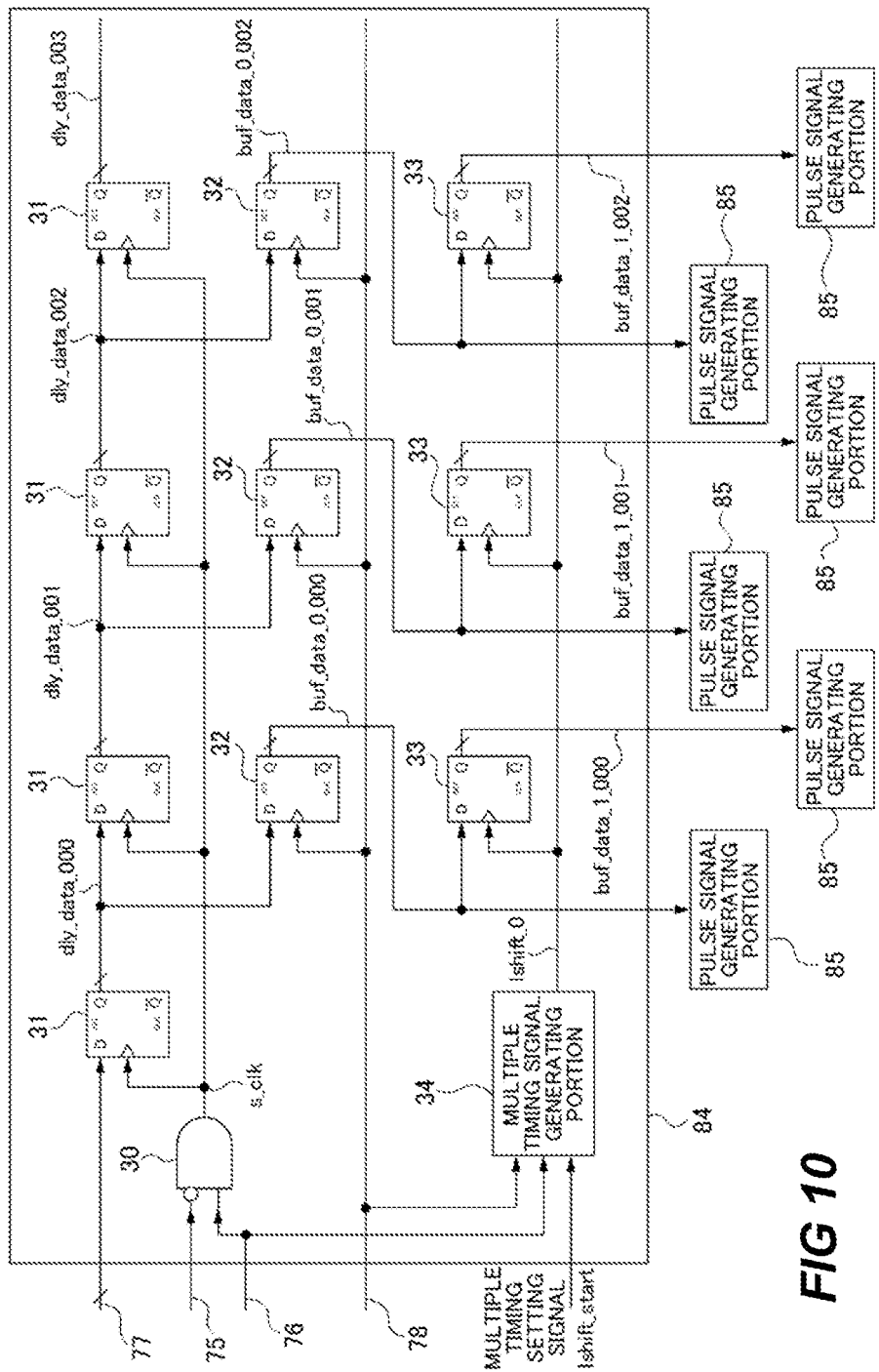
FIG. 10 is a circuit configuration diagram of an image data storage portion.

FIG. 10 is a circuit configuration diagram of the image data storage portion 84. As illustrated in FIG. 10, a clock gate circuit 30 outputs the logical product of the inverted signal of the chip select signal cs and the clock signal clk, and outputs a clock signal s_clk to each flip-flop circuit 31 only when the chip select signal cs is valid. Each flip-flop circuit 31 uses an image data signal data input to the image data storage portion 84 as input, and the same number of flip-flop circuits 31 as the number of light emitting portions 50 arranged in the longitudinal direction of the light emitting element array chip 40 are connected in series.

Each flip-flop circuit 31 operates with the clock signal s_clk transmitted from the clock gate circuit 30. A flip-flop circuit 32 receives the output of each flip-flop circuit 31 as input and operates with the line synchronization signal lsync. The flip-flop circuit 32 outputs image data buf_data_0_000 to buf_data_0_747 to the pulse signal generating portion 85 and a flip-flop circuit 33. The flip-flop circuit 33 receives the output of the flip-flop circuit 32 as input and operates with a multiple timing signal lshift_0. The flip-flop circuit 33 outputs image data buf_data_1_000 to buf_data_1_xxx to the pulse signal generating portion 85.

A multiple exposure timing signal generating portion 34 generates the multiple exposure timing signal lshift_0 based on the line synchronization signal lsync, the clock signal clk, and a multiple timing setting signal lshift_start. In the present embodiment, the multiple timing setting signal lshift_start generates lshift_0 by delaying the cycle of the line synchronization signal lsync by a set value of lshift_start. For example, in a case where lshift_start is set to 1, the multiple timing signal lshift_0 is a signal obtained by delaying the line synchronization signal lsync by one cycle with the clock signal clk.

Figure 11:
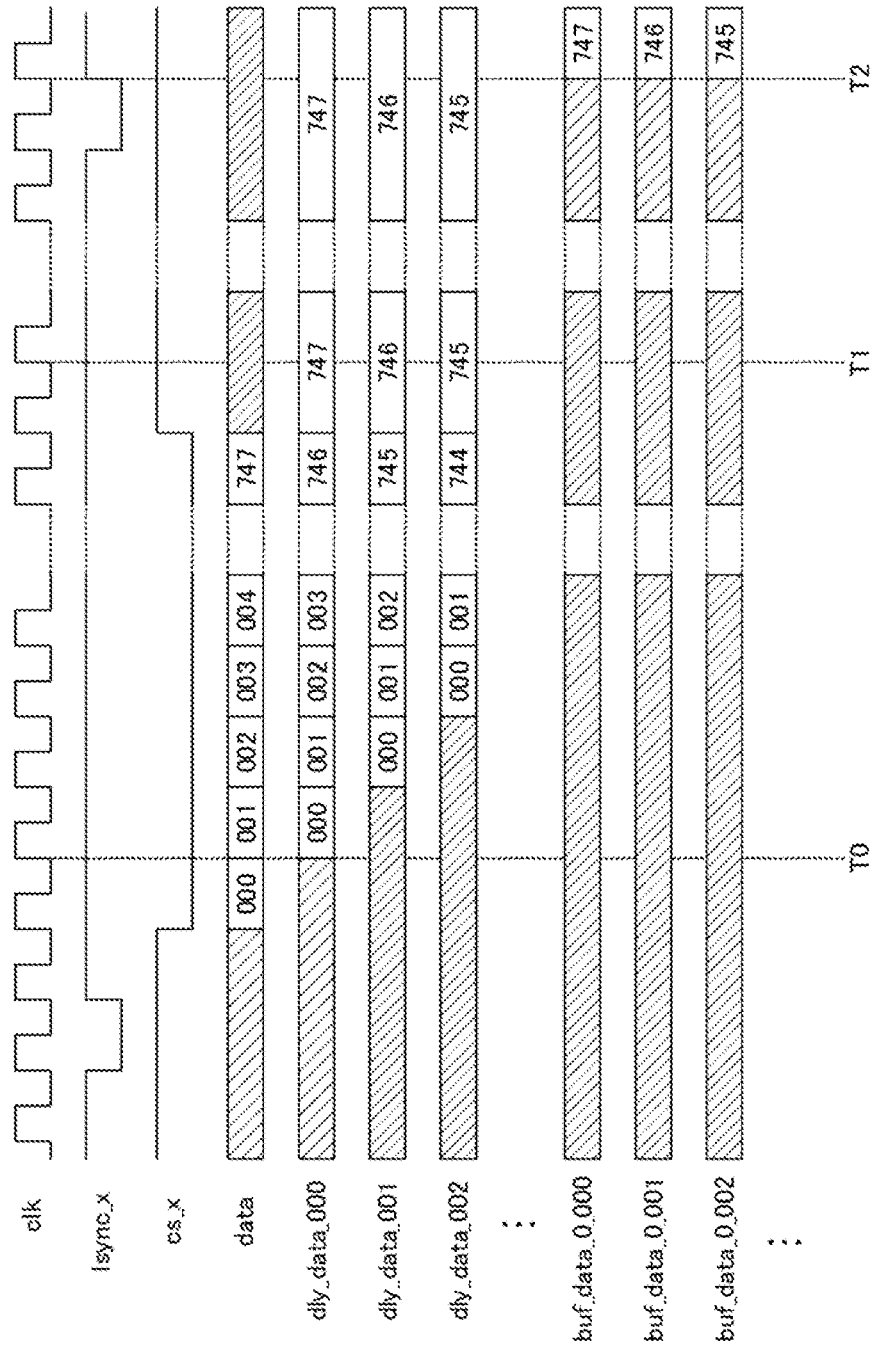
FIG. 11 is a timing chart illustrating an operation in a main scanning direction in the image data storage portion.

FIG. 11 is a timing chart illustrating an operation in the main scanning direction in the image data storage portion 84. The meanings of the symbols illustrated in FIG. 11 are the same as the meanings of the symbols illustrated in FIG. 10. As illustrated in FIG. 11, during a period from time T0 when cs=0 is captured at the rising edge of clk to time T1, image data is sequentially shifted in the order of data, dly_data_000, and dly_data_001. When cs=0, the same number of clock signals as the number of light emitting portions 50 arranged in the main scanning direction are input. As a result, image data for one line is held in dly_data_000 to dly_data_xxx.

Since cs=1 after the time T1, a shift operation is not performed and cs is maintained. When lsync=0 is captured at the rising edge of clk at time T2, image data for one line is simultaneously output to the pulse signal generating portion 85 as buf_data_0_000 to buf_data_0_xxx in the order of dly_data_000, buf_data_0_000, dly_data_001, and buf_data_0_001.

Figure 12:
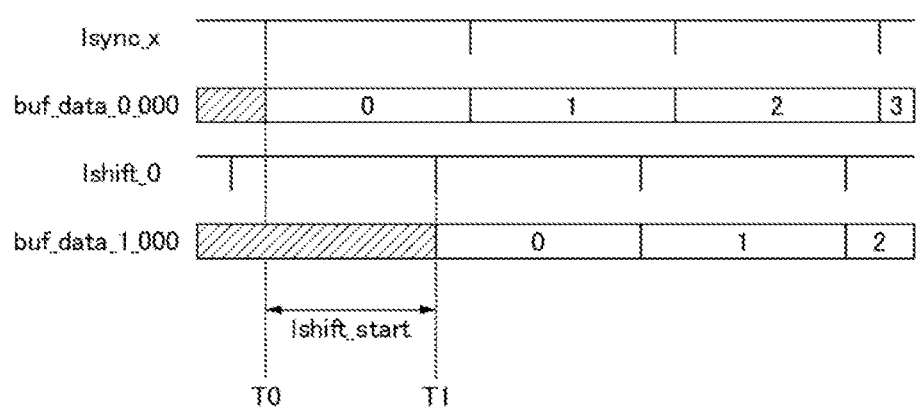
FIG. 12 is a timing chart illustrating an operation in a sub-scanning direction in the image data storage portion.

FIG. 12 is a timing chart illustrating an operation in the sub-scanning direction in the image data storage portion 84. The meanings of the symbols illustrated in FIG. 12 are the same as the meanings of the symbols illustrated in FIG. 10. The output buf_data_0_000 of the flip-flop circuit 32 and the output buf_data_1_000 of the flip-flop circuit 33 illustrated in FIG. 10 will be described below as representatives with reference to FIG. 12. Although not described below, the same applies to all of buf_data_0_001 to buf_data_0_xxx and buf_data_1_001 to buf_data_1_xxx.

As illustrated in FIG. 12, when lsync=0 is input to the flip-flop circuit 32 at time T0, the value of dly_data_000 is output to buf_data_0_000. When lshift_0=0 is input to the flip-flop circuit 33 at time T1, the value of buf_data_0_000 is output as buf_data_1_000 to the pulse signal generating portion 85.

In this manner, the data output to the pulse signal generating portion 85 as buf_data_0_000 when lsync=0 is output to the pulse signal generating portion 85 again as buf_data_1_000 at next lshift_0=0 timing. Multiple exposure is enabled by connecting buf_data_0_000 to the light emitting portion 50 that performs exposure earlier on the photosensitive drum 1, and connecting buf_data_1_000 to the light emitting portion 50 that performs exposure later.

In the present embodiment, the flip-flop circuits have been described as an example of the configuration for holding data of the light emitting portions 50, but the present invention is not limited thereto. That is, for example, the data of the light emitting portions 50 may be held using a memory circuit such as a RAM. However, the flip-flop circuits can be arranged side by side with the light emitting portions 50 as in the present embodiment. As a result, a simple circuit having a small wiring area can be formed.

<Analog Portion>

Next, a configuration of the analog portion 86 will be described. In the following description, two drive portions 61 that drive two light emitting portions 50 will be described, but all the light emitting portions 50 are driven in the same manner.

Figure 13:
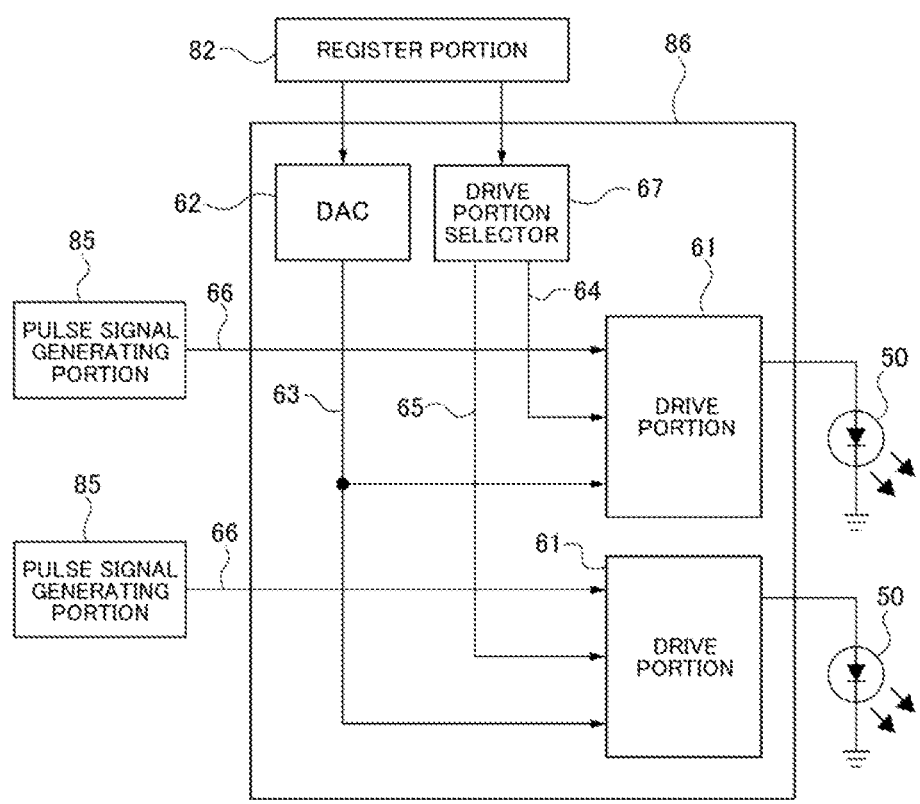
FIG. 13 is a block diagram illustrating a configuration of an analog portion.

FIG. 13 is a block diagram illustrating a configuration of the analog portion 86. As illustrated in FIG. 13, the analog portion 86 includes the drive portions 61 that drive the light emitting portions 50, a digital-to-analog converter (DAC) 62, and a drive portion selector 67.

The DAC 62 supplies an analog voltage for determining a drive current to the drive portions 61 via a signal line 63 based on the data set in the register portion 82. The pulse signal generated by the pulse signal generating portion 85 is input to the drive portions 61 via a signal line 66. As described above, the pulse signal and the analog voltage for determining the drive current are input to the drive portions 61. Then, the drive portions 61 control the drive current and light emission times of the light emitting portions 50 by a drive circuit (described later) based on these signals.

The drive portion selector 67 supplies a drive portion select signal for selecting a drive portion 61 to the two drive portions 61 via signal lines 64 and 65 based on the data set in the register portion 82. The drive portion select signal is generated such that only a signal line connected to the selected drive portion 61 is at a High level. For example, in a case where the drive portion 61 illustrated on the upper side in FIG. 13 is selected, the signal at the High level is supplied only to the signal line 64, and the signal at a Low level is supplied to the signal line 65. In the two drive portions 61, the analog voltage for determining the drive current is set from the DAC 62 when the drive portion select signal becomes the High level. As described above, the CPU 73 sequentially selects the drive portions 61 via the register portion 82 and sets analog voltages of the selected drive portions 61. Therefore, the CPU 73 sets the analog voltages of all the drive portions 61 using one DAC 62.

Figure 14:
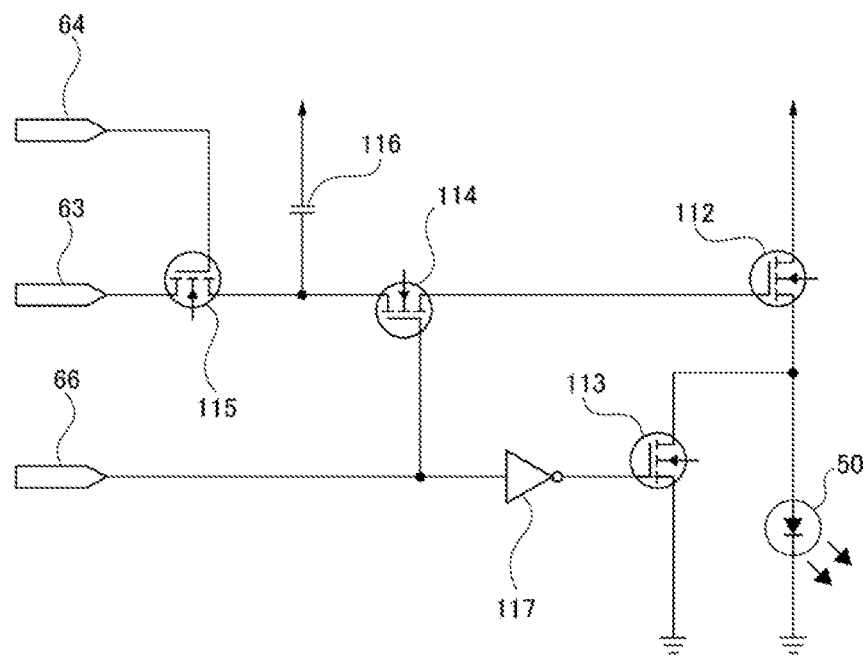
FIG. 14 is a circuit diagram of a drive portion.

Next, a configuration of each drive portion 61 will be described. FIG. 14 is a circuit diagram of the drive portion 61. As illustrated in FIG. 14, the drive portion 61 includes MOSFETs 112 to 115, a capacitor 116, and an inverter 117.

The MOSFET 112 supplies the drive current to the light emitting portion 50 according to the value of the gate voltage, and controls the current such that the drive current is turned off when the gate voltage is at the Low level. The signal line 63 is connected to the gate of the MOSFET 114. When a PWM signal input via the signal line 63 is at the High level, the MOSFET 114 passes a voltage charged in the capacitor 116 to the MOSFET 112.

The MOSFET 115 has a gate connected to the drive portion select signal transmitted from the drive portion selector 67 via the signal line 64. The MOSFET 115 is turned on when the input drive portion select signal is at the High level, and charges the capacitor 116 with the analog voltage output from the DAC 62 and transmitted via the signal line 63. In the present embodiment, the DAC 62 sets the analog voltage across the capacitor 116 before image formation, and keeps the voltage level by turning off the MOSFET 115 during the image forming operation.

By the above-described operation, the MOSFET 112 supplies the drive current to the light emitting portion 50 according to the set analog voltage and the PWM signal. When the input capacitance of the light emitting portion 50 is large and the response speed in an OFF state is low, the response speed in the OFF state can be increased by the MOSFET 113. A signal obtained by logically inverting the PWM signal by the inverter 117 is input to the gate of the MOSFET 113. When the PWM signal is at the Low level, the gate of the MOSFET 113 becomes the High level, and a charge charged in the input capacitance of the light emitting portion 50 is forcibly discharged.

<Rod Lens Array>

Next, a configuration of the rod lens array 23 will be described.

In the present embodiment, as described above, the two light emitting element array chips 40 are arranged at the same position in the arrow X direction and at different positions in the arrow Y direction. In a case where an image is formed on the photosensitive drum 1 by one rod lens array 23 with light emitted from the light emitting portions 50 included in each of the two light emitting element array chips 40, the following problem may occur.

Figure 15A:
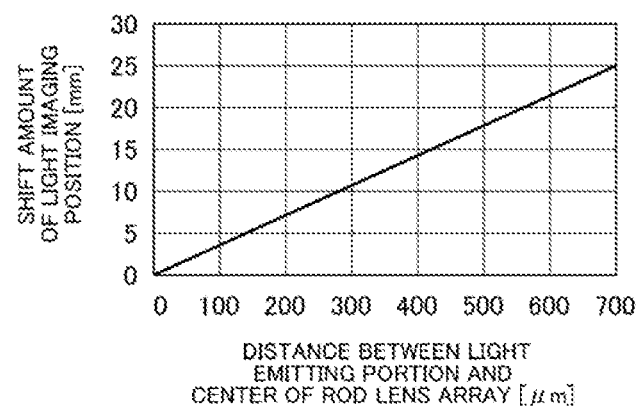
FIGS. 15A and 15B are a graph illustrating a relationship between a distance between a rod lens array and a light emitting portion and a shift amount of a light imaging position, and a graph illustrating a relationship between the distance between the rod lens array and the light emitting portion and a light quantity.
Figure 15B:
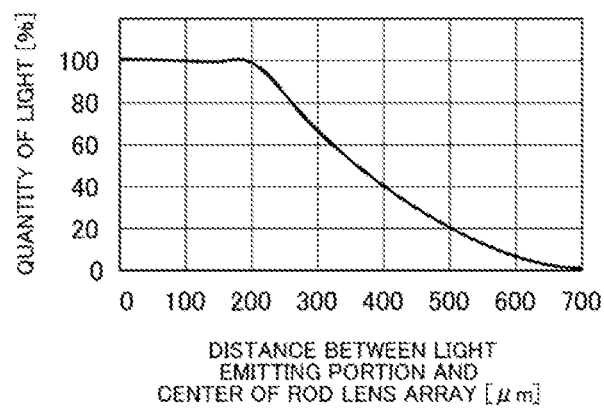

FIG. 15A is a graph illustrating a relationship between the distance in the arrow Y direction between the center of the rod lens array 23 and the light emitting portion 50 and a shift amount of a light imaging position of light emitted from the light emitting portion 50 and forming an image on the photosensitive drum 1 by using the rod lens array 23 from an ideal position. FIG. 15B is a graph illustrating a relationship between the distance in the arrow Y direction between the center of the rod lens array 23 and the light emitting portion 50 and the quantity of the light emitted from the light emitting portion 50 and forming the image on the photosensitive drum 1 by using the rod lens array 23.

As illustrated in FIGS. 15A and 15B, in a case where the light emitting portion 50 is located at a position away from the center of the rod lens array 23, a shift amount of a light imaging position on the photosensitive drum 1 from the ideal position increases, and the quantity of the light forming the image on the photosensitive drum 1 also decreases. That is, in a case where an image is formed on the photosensitive drum 1 using one rod lens array 23 with light emitted from the light emitting portions 50 of the two light emitting element array chips 40 described above, there may be a problem of a shift of a light imaging position and a decrease in the quantity of the light on the photosensitive drum 1. Furthermore, as a problem with the rod lens array 23, in a case where the diameter of the rod lens array 23 is increased, the focal depth decreases and the focus tends to be shifted, and the lens aberration increases and the shape of the focused spot deteriorates and the image quality tends to deteriorate.

Figure 16:
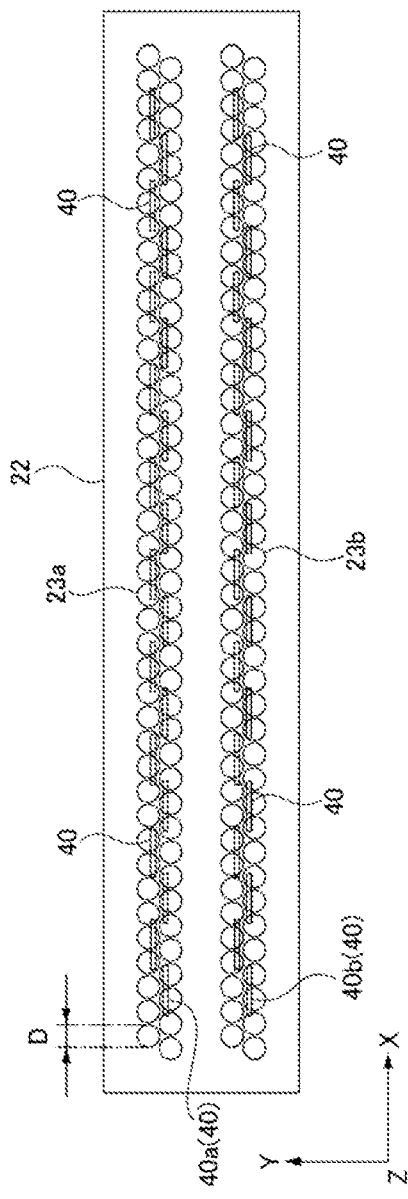
FIG. 16 is a diagram illustrating a configuration of the rod lens array.

Therefore, as illustrated in FIG. 16, a rod lens array 23*a* (first lens) fixed to the housing 24 is provided at a position facing the light emitting element array chip 40*a*. In addition, a rod lens array 23*b* (second lens) separated from the rod lens array 23*a* and fixed to the housing 24 is provided at a position facing the light emitting element array chip 40*b*. The rod lens array 23*a* forms an image of light emitted from the light emitting portions 50 included in the light emitting element array chip 40*a* on the surface of the photosensitive drum 1. The rod lens array 23*b* forms an image of light emitted from the light emitting portions 50 included in the light emitting element array chip 40*b* on the surface of the photosensitive drum 1.

In the present embodiment, as the rod lens array 23a, a SELFOC lens array is used in which SELFOC lenses having a diameter D of 270 µm are two-dimensionally arranged in the arrow X direction and the arrow Y direction and integrally formed. The configuration of the rod lens array 23b is the same as or similar to the configuration of the rod lens array 23a.

In this manner, the two rod lens arrays 23a and 23b are arranged at positions facing the two light emitting element array chips 40a and 40b, respectively. As a result, the distance in the arrow Y direction between each light emitting portion 50 included in the light emitting element array chip 40a and the rod lens array 23a is reduced, and the distance in the arrow Y direction between each light emitting portion 50 included in the light emitting element array chip 40b and the rod lens array 23b is reduced. Therefore, it is possible to suppress the shift of the image forming position and the decrease in the quantity of the light emitted from each light emitting portion 50 included in each of the light emitting element array chips 40a and 40b on the photosensitive drum 1, and to suppress the defocus and the deterioration of the spot shapes of the rod lens arrays 23a and 23b.

In a case where the distance in the arrow Y direction between the two light emitting element array chips 40a and 40b arranged at the same position in the arrow X direction and at different positions in the arrow Y direction is too short, the following problem may occur. That is, light emitted from the light emitting portions 50 of the light emitting element array chip 40a may be incident on the rod lens array 23b, and exposure processing may be performed at an unintended position on the photosensitive drum 1, so that image quality may deteriorate. Similarly, light emitted from the light emitting portions 50 of the light emitting element array chip 40b may be incident on the rod lens array 23a, and exposure processing may be performed at an unintended position on the photosensitive drum 1, so that image quality may deteriorate.

As illustrated in FIG. 15B, when the distance in the arrow Y direction between the center of the rod lens array 23 and each light emitting portion 50 is about 700 µm or more, a quantity of light forming an image on the photosensitive drum 1 is 0. Therefore, the light emitting element array chips 40a and 40b and the rod lens arrays 23a and 23b are arranged such that the distance in the arrow Y direction between each light emitting portion 50 of the light emitting element array chip 40a and the center of the rod lens array 23b and the distance in the arrow Y direction between each light emitting portion 50 of the light emitting element array chip 40b and the center of the rod lens array 23a are about 700 µm or more. As a result, it is possible to suppress deterioration of image quality due to exposure processing performed at an unintended position on the photosensitive drum 1.

Figure 17:
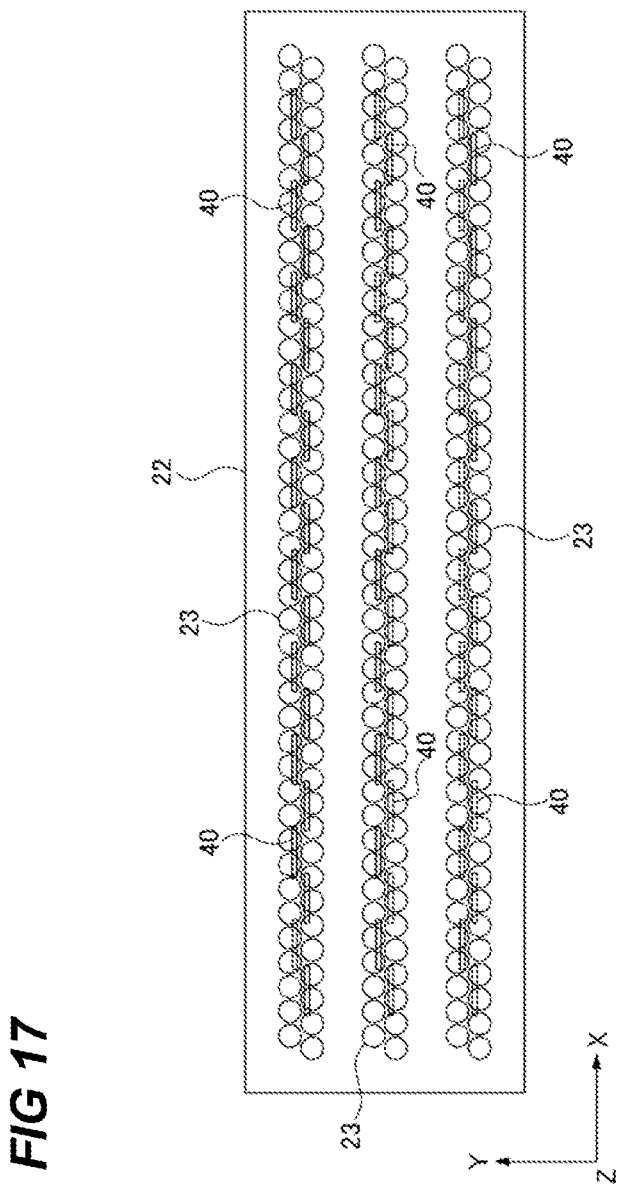
FIG. 17 is a diagram illustrating another configuration of the exposure head.

In the present embodiment, the description has been given of the configuration in which the two light emitting element array chips 40 are arranged at the same position in the arrow X direction and at different positions in the arrow Y direction, and the rod lens arrays 23 are arranged at positions facing the light emitting element array chips 40. However, the number of sets of the light emitting element array chips 40 and the rod lens arrays 23 is not limited to two as long as it is plural. That is, for example, as illustrated in FIG. 17, multiple exposure may be performed with three sets of the light emitting element array chips 40 and the rod lens arrays 23.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2020-210269, filed Dec. 18, 2020, which is hereby incorporated by reference herein in its entirety.

What is claimed is:

1. An image forming apparatus that irradiates a surface of a photoreceptor with light to form an electrostatic latent image and causes toner to adhere to the electrostatic latent image to form an image, the image forming apparatus comprising:
   an exposure head configured to irradiate the surface of the photoreceptor with light to form the electrostatic latent image,
   the exposure head including:
      a housing;
      a first circuit board fixed to the housing;
      a first light emitting chip and a second light emitting chip that each include a second circuit board mounted on the first circuit board, and a plurality of light emitting portions configured to emit light, the plurality of light emitting portions including a first electrode layer including a plurality of electrodes arranged in a rotational axis direction of the photoreceptor and arranged separately on the second circuit board, a light emitting layer laminated on the first electrode layer and configured to emit light when a voltage is applied, and a second electrode layer configured to allow light to pass through and arranged on a side opposite to a side where the first electrode layer is arranged with respect to the light emitting layer, the first light emitting chip and the second light emitting chip being arranged at the same position in the rotational axis direction of the photoreceptor and at different positions in a rotational direction of the photoreceptor;
      a first lens configured to form an image of light emitted from the plurality of light emitting portions included in the first light emitting chip on the photoreceptor, the first lens being fixed to the housing at a position facing the first light emitting chip; and
      a second lens configured to form an image of light emitted from the plurality of light emitting portions included in the second light emitting chip on the photoreceptor, the second lens being provided separately from the first lens and being fixed to the housing at a position facing the second light emitting chip; and
   a controller configured to control application of a voltage to each of the plurality of electrodes of the first light emitting chip and the plurality of electrodes of the second light emitting chip based on image data such that the light emitting layer of the first light emitting chip and the light emitting layer of the second light emitting chip emit light, the controller being capable of controlling application of the voltage to each of the plurality of electrodes of the first light emitting chip and the plurality of electrodes of the second light emitting chip such that one pixel is formed by applying the voltage to the plurality of electrodes of the first light emitting chip and the plurality of electrodes of the second light emitting chip.

2. The image forming apparatus according to claim 1, wherein
the plurality of electrodes of the first light emitting chip is two-dimensionally arranged in the rotational direction and the rotational axis direction,
the plurality of electrodes of the second light emitting chip is two-dimensionally arranged in the rotational direction and the rotational axis direction, and
the controller is capable of controlling application of a voltage to each of the plurality of electrodes of the first light emitting chip and the plurality of electrodes of the second light emitting chip such that one pixel is formed by applying a voltage to the plurality of electrodes arranged at different positions in the rotational direction in the first light emitting chip and one pixel is formed by applying a voltage to the plurality of electrodes arranged at different positions in the rotational direction in the second light emitting chip.

3. The image forming apparatus according to claim 1, wherein
each of the light emitting layer of the first light emitting chip and the light emitting layer of the second light emitting chip is an organic light emitting layer.

* * * * *